Oct. 19, 1937.  H. D. GEYER  2,096,239

CASTER HAVING AN INCLINED AXIS

Filed May 2, 1935

INVENTOR
Harvey D. Geyer
BY
Spencer Hardman & Feber
HIS ATTORNEYS

Patented Oct. 19, 1937

2,096,239

UNITED STATES PATENT OFFICE 2,096,239

CASTER HAVING AN INCLINED AXIS

Harvey D. Geyer, Dayton, Ohio, assignor to General Motors Corporation, Detroit, Mich., a corporation of Delaware Application May 2, 1935, Serial No. 19,353

5 Claims. (Cl. 16—18)

This invention relates to an improved form of swivel caster designed to be used on the floor legs of refrigerators, stoves, tables, beds, desks, chairs, etc.

An object of this invention is to provide a caster that very easily swivels to its following position and so prevents the caster roller from being slid sidewise over the floor, thus preventing marring of the floor.

A more specific object is to provide a caster having its roller rotatably mounted upon a bearing whose axis is downwardly inclined towards the floor so as to cause said roller to rotate in a plane extending at an angle to the floor. This feature has various important advantages, as follows: (1) it causes the caster roller to more easily orient itself to the proper position to carry its load in the desired direction; (2) it permits a very simple and efficient form of sealed-end bearing for the caster roller having a single hardened steel ball for carrying the thrust load; (3) the sealed end of the roller bearing is adjacent the floor while the non-sealed end thereof is turned upward away from the floor, which substantially eliminates the tendency of the roller to pick up threads or hair from the floor and wind it around the projecting end of the roller shaft; (4) the downwardly inclined bearing recess in the roller serves as an oil-retaining reservoir from which the lubricating oil supplied thereto cannot leak due to the sealed end thereof, thus greatly facilitating the proper lubrication of the caster roller bearing.

Another advantage of the caster roller of this invention is the ease with which it can be efficiently molded from rubber or other suitable moldable material, due to the fact that one end thereof is entirely closed or sealed and hence a simpler form of mold may be used for molding same.

Further objects and advantages of the present invention will be apparent from the following description, reference being had to the accompanying drawing, wherein a preferred embodiment of the present invention is clearly shown.

In the drawing:

Fig. 3 is an elevation similar to Fig. 1.

Fig. 4 is a section taken on line 4—4 of Fig. 3.

Similar reference characters refer to similar parts throughout the several views.

Figures 1, 2:
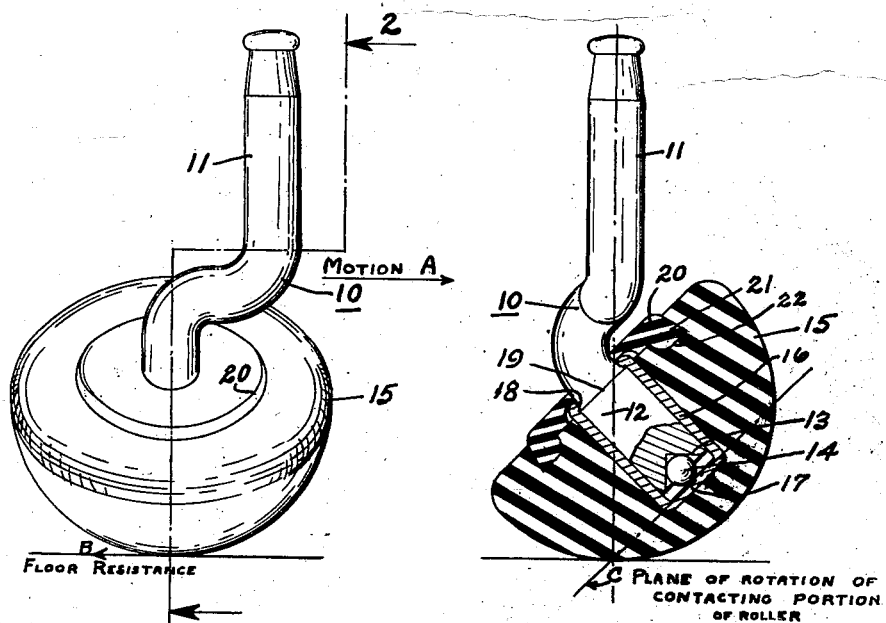
Fig. 1 is an elevation of the caster of this invention apart from the supported leg into which the upright shank is rotatably mounted.
Fig. 2 is a section taken on line 2—2 of Fig. 1.

The shank member 10, preferably of steel, has an upright portion 11 which is adapted to fit into and swivel within a socket provided in the leg of the device supported by the caster in the ordinary manner. The lower end of shank 10 is laterally offset and terminates in a downwardly inclined pivot portion 12 which serves as the shaft for the caster roller 15. Caster roller 15 is provided with a molded-in cylindrical bearing bushing 16 which fits upon pivot portion 12 and has a closed end 17 which supports the end thrust of the shaft portion 12 due to the inclination thereof. This design permits the use of the very simple and efficient ball thrust bearing illustrated in Fig. 2. Preferably the end of pivot portion 12 is recessed to provide a suitable ball seat 13, and a hardened steel ball 14 is retained centrally located by seat 13 and bears upon the hardened closed end 17 of the metal bushing insert 16. In the form of the invention illustrated in Figs. 1 and 2, it will be seen that about half of the total weight supported by the caster is taken by the ball thrust bearing, and the other half is taken by the plain bearing of the cylindrical portion of insert 16 upon the shaft portion 12. This provides for a very easy rotation of the roller 15 upon its support and reduced wear of the bearing surfaces.

When roller 15 is molded of hard or semi-hard rubber, "bakelite", or other moldable material, the metal insert bushing 16 is set within the mold cavity and held properly located therein by a fixed locating pin which fits snugly within bushing 16 which at this time does not have its open end turned inwardly as appears in Fig. 2. The substantially hemi-spherical roller 15 is molded to the form shown in Fig. 2 and is bonded to the insert 16 during molding. The molded roller 15 may then be simply slipped over the portion 12 and be permanently assembled thereupon by turning or spinning the projecting metal lip 18 over the shoulder 19 on the shaft 12, as shown in Fig. 2. This prevents the roller 15 from slipping from the end of shaft 12 whenever the caster is raised from the floor. Preferably a dirt and dust cover 20 is provided for the upper or non-sealed end of the bearing. Cover 20 is preferably molded to the shape shown in Fig. 2 from a graphite-bearing soft rubber compound, and is retained in place by a flexible peripheral dove-tail flange 21 which is simply forced into the correspondingly shaped recess 22 in the molded roller 15. Cover 20 of course turns with the roller 15 and has a snug fit upon the metal shaft. A desired amount of lubricating oil or grease is put into the bearing before or after the roller is assembled upon the shaft 12, but prior to the assembling of cover 20 thereupon. This lubricant cannot leak by gravity or be pressed out of the lower sealed end of the bearing and so will give perfect lubrication for both the thrust bearing and plain bearing for very long periods.

In operation, it will be noted that this caster swivels very easily about the axis of the upright portion 11 due to the fact that the hemi-spherical roller 15 acts somewhat after the manner of a large ball bearing rolling upon the floor in any desired direction of movement. When the direction of movement is that of arrow "A" in Fig. 1, the floor resistance (indicated by arrow "B" in Fig. 1) causes the roller to rotate, and the floor-contacting portion of the roller moves in the plane "C" (see Fig. 2) which lies at an angle to the vertical plane of the direction of movement.

Figures 3, 4:
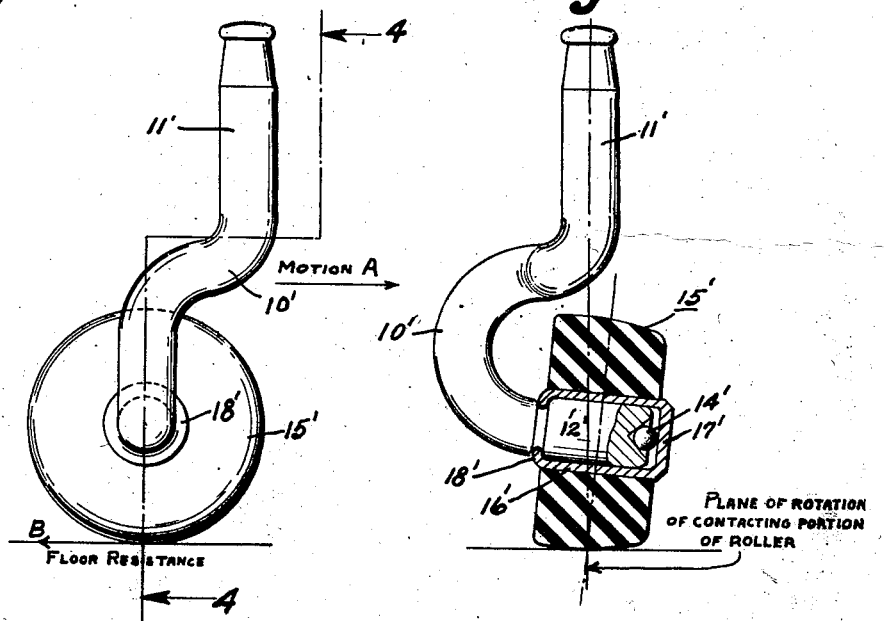
Figs. 3 and 4 illustrate a modified form of the invention.

The form of the invention shown in Figs. 3 and 4 differs from that of Figs. 1 and 2, mainly in that the molded roller 15' is not continued in hemi-spherical form around the sealed end 17' of the metal bearing insert 16' and thus the roller 15' appears more like an ordinary caster roller. Also the angle of inclination of the axis of bearing portion 12' of the shaft is less than in the above form and hence there is less load on the end thrust bearing 14', 17'. Preferably the tread curvature of the roller 15' is parti-spherical having its center of curvature on the axis of the shaft bearing portion 12'. This form functions similarly to that of Figs. 1 and 2, as fully described above.

While the embodiment of the present invention as herein disclosed, constitutes a preferred form, it is to be understood that other forms might be adopted, all coming within the scope of the claims which follow.

What is claimed is as follows:

1. A caster comprising: an upright shank portion having a laterally offset roller pivot portion, said pivot portion being downwardly inclined towards its end, and a caster roller mounted upon said inclined pivot portion so as to rotate in a plane extending at an angle to the supporting floor, said roller having a thrust bearing having one axially located ball contacting the lower end of said pivot portion.

2. A caster comprising: an upright shank portion having a laterally offset roller pivot portion, said pivot portion being downwardly inclined towards its end, and a caster roller mounted upon said inclined pivot portion so as to rotate in a plane extending at an angle to the supporting floor, said roller having a downwardly inclined closed-bottom bearing bushing bearing directly upon said pivot portion and serving as an oil-retaining recess for said bearing.

3. A caster comprising: an upright shank portion having a laterally offset roller pivot portion, said pivot portion being downwardly inclined towards its end, and a caster roller mounted upon said inclined pivot portion so as to rotate in a plane extending at an angle to the supporting floor, the lower end of said pivot portion having an axial ball recess, a single axially located bearing ball located in said recess and contacting the bottom of the bearing recess in said roller and serving as a thrust bearing between said inclined pivot portion and roller.

4. A caster comprising: an upright shank portion having a laterally offset roller pivot portion, said pivot portion being downwardly inclined towards its end, a caster roller mounted upon said inclined pivot portion so as to rotate in a plane extending at an angle to the supporting floor, said roller having a single ball thrust bearing contacting the lower end of said pivot portion, and said roller having an inclined closed-bottom bearing bushing bearing directly upon said pivot-portion and serving as an oil-retainer for both the axial and thrust bearings.

5. A caster comprising: an upright shank portion having a laterally offset roller pivot portion, said pivot portion being downwardly inclined toward its free end and having an upwardly facing shoulder thereon adjacent its upper end, and a caster roller mounted upon said inclined pivot portion so as to rotate in a plane extending at an angle to the supporting floor, said roller having a closed-bottom metal cup serving as a bearing bushing therefor said cup having a retaining portion slidingly engaging said shoulder.

HARVEY D. GEYER.